US008746801B2

(12) United States Patent
Nakata

(10) Patent No.: US 8,746,801 B2
(45) Date of Patent: Jun. 10, 2014

(54) HEADREST STRUCTURE

(75) Inventor: Shinichi Nakata, Yokohama (JP)

(73) Assignee: NHK Spring Co., Ltd., Yokohama-shi (JP)

( * ) Notice: Subject to any disclaimer, the term of this patent is extended or adjusted under 35 U.S.C. 154(b) by 0 days.

(21) Appl. No.: 13/612,622

(22) Filed: Sep. 12, 2012

(65) Prior Publication Data

US 2013/0076095 A1 Mar. 28, 2013

(30) Foreign Application Priority Data

Sep. 27, 2011 (JP) .................................. 2011-211478

(51) Int. Cl.
*A47C 7/36* (2006.01)
(52) U.S. Cl.
USPC .......................................................... 297/410
(58) Field of Classification Search
USPC ...................................... 297/410, 391, 463.1
See application file for complete search history.

(56) References Cited

U.S. PATENT DOCUMENTS

| 4,976,493 | A * | 12/1990 | Frankila | 297/410 |
| 8,042,428 | B2 * | 10/2011 | Shimizu et al. | 74/502.4 |
| 8,118,360 | B2 * | 2/2012 | Oota et al. | 297/216.12 |
| 8,167,376 | B2 * | 5/2012 | Song | 297/410 |

FOREIGN PATENT DOCUMENTS

JP 2006-346342 12/2006

* cited by examiner

*Primary Examiner* — Milton Nelson, Jr.
(74) *Attorney, Agent, or Firm* — Knobbe Martens Olson & Bear LLP

(57) ABSTRACT

A headrest structure is equipped with a headrest main body; a headrest stay that supports the headrest main body; and a stopper member, a first end portion of the stopper member configuring a fixing portion fixed to the bottom end portion of the headrest stay, a second end portion of the stopper member configuring a stopper portion that is inserted into a support portion and is formed with a claw portion, when the stopper portion is inserted into the support portion, the claw portion resiliently deforming, when the stopper portion has been completely inserted into the support portion, the claw portion resiliently rebounding such that the outer diameter of the claw portion exceeds the inner diameter of the support portion, and when the stopper portion moves in a direction of exiting from the support portion, the claw portion catches on an end portion of the support portion.

6 Claims, 10 Drawing Sheets

HEADREST STRUCTURE

CROSS-REFERENCE TO RELATED APPLICATION

This application claims priority under 35 USC 119 from Japanese Patent Application No. 2011-211478 filed Sep. 27, 2011, the disclosure of which is incorporated by reference herein.

BACKGROUND

1. Technical Field

The present invention relates to a headrest structure that supports the head of an occupant.

2. Related Art

Previously known headrest structures are provided with a pull-out preventer at a bottom end portion of a headrest stay to prevent the headrest stay from exiting from a seatback unintentionally. For example, a headrest structure is disclosed in Japanese Patent Application Laid-Open (JP-A) No. 2006-346342 wherein a slit is provided at a bottom end portion of a headrest stay and a rotational stopper is axially supported in the slit. The headrest stay is prevented from exiting from the seatback unintentionally by the rotational stopper catching on an end portion of a headrest bush provided at the seatback.

However, in conventional structures plural mechanical machining operations need to be performed, such as machining slits and machining holes, in order to provide the pull-out preventer to the bottom end portion of the headrest stay. The pull-out preventer is also configured from plural components, such as the rotational stopper and a shaft for axially supporting the rotational stopper. A significant number of steps is therefore required to assemble these components.

SUMMARY

In consideration of the above circumstances the present invention provides a headrest structure capable of suppressing machining to a headrest stay and an increase in the number of components.

A headrest of a first aspect of the present invention is equipped with a headrest main body provided above a seatback and supporting a head of an occupant; a headrest stay that supports the headrest main body so as to be capable of moving in a seat top-bottom direction due to a top end side of the headrest stay being fixed to the headrest main body and a bottom end portion of the headrest stay being inserted into a tube shaped support portion provided at a top end portion of the seatback; and a stopper member of integral structure, a first end portion of the stopper member configuring a fixing portion fixed to the bottom end portion of the headrest stay, a second end portion of the stopper member configuring a stopper portion that is inserted into the support portion and is formed with a claw portion, when the stopper portion is inserted into the support portion, the claw portion resiliently deforming such that an outer diameter of the claw portion corresponds to an inner diameter of the support portion or smaller, when the stopper portion has been completely inserted into the support portion, the claw portion resiliently rebounding such that the outer diameter of the claw portion exceeds the inner diameter of the support portion, and when the stopper portion moves in a direction of exiting from the support portion, the claw portion catches on an end portion of the support portion.

According to the first aspect of the present invention, when the stopper portion of the stopper member attached to the leading end of the headrest stay is inserted into the support portion provided at the top end portion of the seatback, the stopper portion is insertable into the support portion by the outer diameter of the claw portion resiliently deforming to become the inner diameter of the support portion or smaller. When the stopper portion has been completely inserted into the support portion, the stopper portion resiliently rebounds, opening out such that the outer diameter of the claw portion exceeds the inner diameter of the support portion. Hence even if the stopper member moves in the direction of exiting from the support portion of the seatback, the stopper member cannot exit from the support portion due to the claw portion catching on the end portion of the support portion. Namely, due to providing the integrally structured stopper member in the first aspect of the present invention, machining performed to the headrest stay and an increase in the number of components are suppressed while still preventing the headrest stay from exiting from the support portion provided at the top end portion of the seatback unintentionally.

The headrest structure of the first aspect of the present invention exhibits the excellent advantageous effect of being able to suppress machining to the headrest stay and an increase in the number of components.

A headrest stay of a second aspect of the present invention is the first aspect of the present invention wherein the headrest stay is configured with a hollow pipe structure at least at the bottom end portion of the headrest stay, and an anchor hole is provided at a peripheral wall of the bottom end portion of the headrest stay; and an anchor projection is provided at the fixing portion of the stopper member and the anchor projection latches into the anchor hole due to being inserted into the bottom end portion of the headrest stay.

In the second aspect of the present invention, the stopper member is fixed to the headrest stay by the anchor projection provided at the fixing portion of the stopper member latching into the anchor hole provided at the headrest stay. In other words, the stopper member is fixed to the headrest stay with a simple configuration, namely the anchor projection provided at the fixing portion of the stopper member and the anchor hole provided at the headrest stay.

The headrest structure of the second aspect of the present invention exhibits the excellent advantageous effect of enabling the stopper member to be fixed to the headrest stay with a simple configuration, namely the anchor projection provided at the fixing portion of the stopper member and the anchor hole provided at the headrest stay.

A headrest structure of a third aspect of the present invention is the second aspect of the present invention wherein a rigidity lowering portion is provided at the fixing portion of the stopper member to render the fixing portion resiliently deformable in a direction in which the anchor projection exits from the anchor hole.

In the third aspect of the present invention, the anchor projection is suppressed from snagging on the bottom end portion of the headrest stay when the fixing portion of the stopper member is inserted into the bottom end portion of the headrest stay due to the rigidity lowering portion being provided at the fixing portion of the stopper member. Namely, the projecting portion is suppressed from snagging on the bottom end portion of the headrest stay due to the fixing portion being inserted into the bottom end portion of the headrest stay in a state in which the fixing portion has been resiliently deformed in a direction opposite to a projection direction of the anchor projection provided at the fixing portion of the stopper member.

The headrest structure of the third aspect of the present invention exhibits the excellent advantageous effect of enabling the anchor projection to be suppressed from snagging on the bottom end portion of the headrest stay when the fixing portion of the stopper member is inserted into the bottom end portion of the headrest stay.

A headrest structure of a fourth aspect of the present invention is the third aspect of the present invention wherein a rigidity lowering portion is provided at the stopper portion of the stopper member to render the stopper portion resiliently deformable in a direction substantially orthogonal to a direction in which the anchor projection is projected.

In the fourth aspect of the present invention, the rigidity lowering portion is provided at the stopper portion in order to render the stopper portion resiliently deformable in a direction substantially orthogonal to a projection direction of the anchor projection provided at the fixing portion. Consequently, the anchor projection provided at the fixing portion is suppressed from deforming in the direction in which the anchor projection exits from the anchor hole provided at the headrest stay when the stopper portion is deformed. Namely, the fixing portion is suppressed from exiting from the headrest stay when the stopper portion deforms. Note that the direction substantially orthogonal to the projection direction of the anchor projection is not limited to a direction that forms an angle of 90° with the projection direction of the anchor projection, and may be displaced therefrom within a range in which the above effect is obtained.

The headrest structure of the fourth aspect of the present invention exhibits the excellent advantageous effect of enabling the fixing portion to be suppressed from exiting from the headrest stay when the stopper portion deforms.

A headrest structure of a fifth aspect of the present invention is the first aspect of the present invention wherein a wiring layout through hole is formed in the stopper member spanning the fixing portion and the stopper portion.

In the fifth aspect of the present invention the through hole is provided in the above configuration. It is accordingly possible, for example, to layout wiring of electrical components such as a headrest monitor provided at the headrest body towards the interior of the seatback. As a result, negative impact to the external design appearance of the headrest, such as by wiring of electrical components laid out so as to project out from the vicinity of the headrest main body, can be suppressed.

The headrest structure of the fifth aspect of the present invention exhibits the excellent advantageous effect of enabling negative impact to the external design appearance of the headrest to be suppressed.

A headrest structure of a sixth aspect of the present invention is the first aspect of the present invention wherein a guide portion is provided at the stopper portion of the stopper member to resiliently deform the stopper portion such that the outer diameter of the claw portion becomes an outer diameter that is smaller than the inner diameter of the support portion.

In the sixth aspect of the present invention the guide portion is provided in the above configuration. Therefore when the need arises to remove the headrest stay from the support portion of the seatback for vehicle maintenance or component replacement, resiliently deformation can be induced such that the outer diameter of the claw portion is made smaller than the inner diameter of the support portion of the seatback by an operator manipulating the guide portion. Namely, operation to remove the headrest from the seatback is made easy by provision of the guide portion.

The headrest structure of the sixth aspect of the present invention exhibits the excellent advantageous effect of enabling the ease of service for the operation to remove the headrest from the seatback to be raised.

BRIEF DESCRIPTION OF THE DRAWINGS

Exemplary embodiments of the present invention will be described in detail based on the following figures, wherein.

DETAILED DESCRIPTION

Explanation follows regarding a headrest stay of a first exemplary embodiment of the present invention, with reference to FIG. 1 to FIG. 4D. The vehicle front-rear direction front side is indicted by arrow FR, the vehicle width direction right hand side is indicated by arrow RH and the vehicle top-bottom direction top side is indicated by arrow UP.

Figure 1:
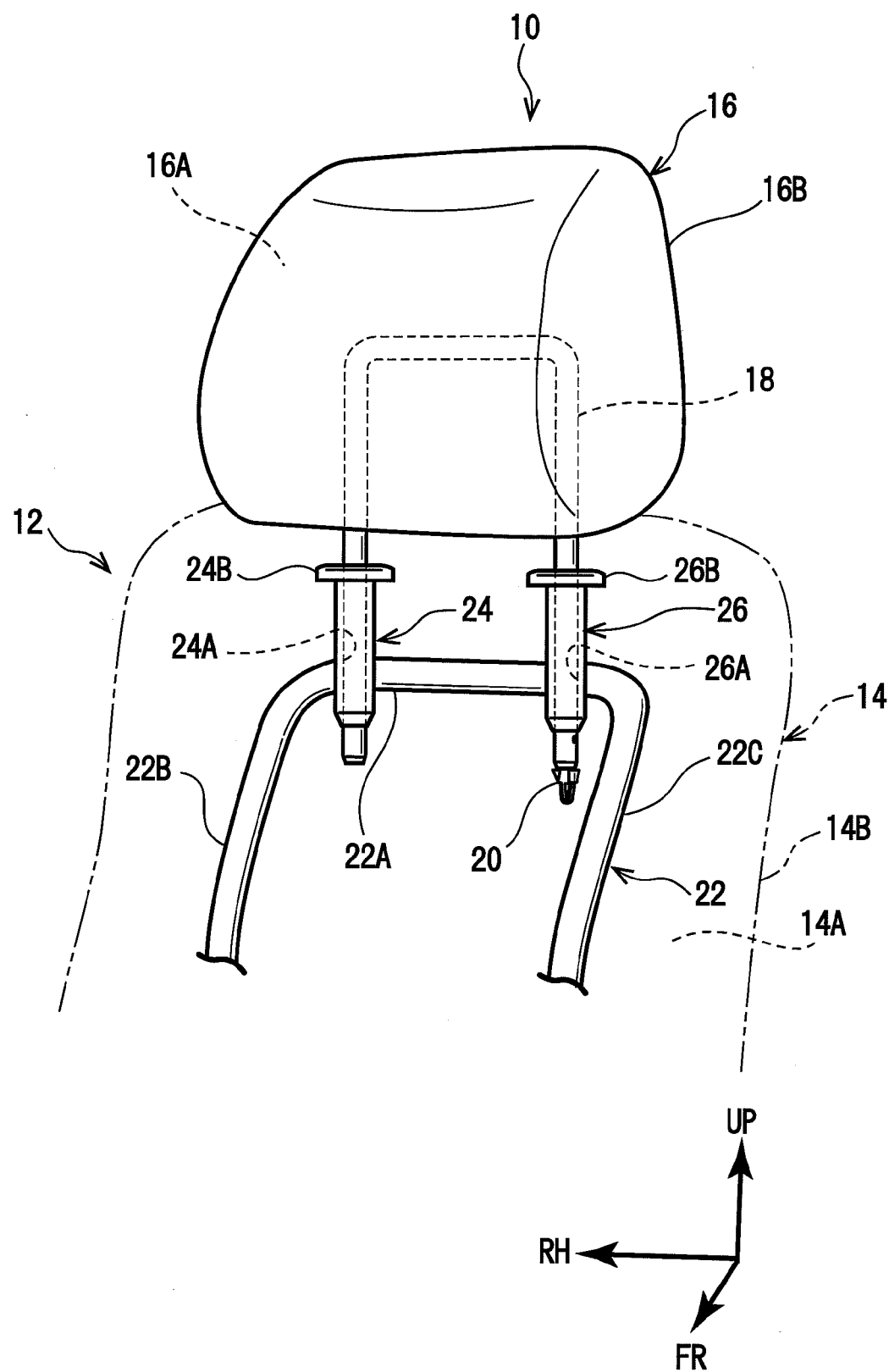
FIG. 1 is a perspective view illustrating a headrest structure.

As shown in FIG. 1, a headrest 10 is configured with principal elements of a headrest main body 16 that is provided above a seatback 14 of a vehicle seat 12 on which an occupant sits and supports the head of the occupant, a headrest stay 18 that supports the headrest main body 16 so as to be capable of moving in the up-down direction with respect to the seatback 14, and a stopper member 20 attached to a bottom end portion of the headrest stay 18. Explanation first follows regarding the seatback 14 to which the headrest 10 is attached. Then the headrest stay 18 and the headrest 10 will be explained in sequence, before finally explaining the stopper member 20 that is a relevant portion of the present invention.

(Seatback)

The seatback 14 is provided extending up from an edge portion of a seat cushion, not shown in the drawings, of a vehicle seat 12 and configured so as to be reclinable. The seatback 14 serves the role of supporting the back of an occupant seated on the seat cushion. In more detail, the seatback 14 is configured with a seatback pad 14A molded in urethane foam fixed to a seatback frame 22 formed in a U-shape opening towards the bottom when viewed face-on. A covering material 14B formed from a material such as cloth or leather also covers the surface of the seatback pad 14A.

The seatback frame 22 is formed, for example, by bend-machining hollow steel pipe material. More specifically, the seatback frame 22 is provided with a first frame portion 22A that extends in the vehicle width direction, a second frame portion 22B that bends around towards the vehicle bottom side in the seated state from the vehicle width direction right hand side end portion of the first frame portion 22A, and a third frame portion 22C that bend around towards the vehicle bottom side from the vehicle width direction left hand side end portion of the first frame portion 22A and extends substantially parallel to the second frame portion 22B. The bottom end portions of the second frame portion 22B and the third frame portion 22C are configured with joining portions for joining to a seat cushion frame, not shown in the drawings. Plural side wires, not shown in the drawings, span across between the second frame portion 22B and the third frame portion 22C. Configuration is such that load occurring when an occupant leans against the seatback 14 is transmitted to the seatback frame 22 through the plural side wires. A tube shaped first attachment member (not shown in the drawings) passing through along the vehicle top-bottom direction is joined by welding to a vehicle width direction right hand side end portion of the first frame portion 22A. A second attachment member (not shown in the drawings) of substantially the same shape as the first attachment member is joined to a vehicle width direction left hand side end portion of the first frame portion 22A so as to be substantially parallel to the first attachment member.

A first headrest bush 24 is inserted into and fixed to the first attachment member, and serves as a support portion formed with a support hole 24A. A flange portion 24B is formed to the top end portion of the first headrest bush 24. A second headrest bush 26 is inserted into and fixed to the second attachment member, and serves as a support portion formed with a support hole 26A. A flange portion 26B is formed to the top end portion of the second headrest bush 26. A position restricting portion (not shown in the drawings) is also provided at the flange portion 26B for restricting the vehicle top-bottom direction position of the headrest stay 18 as explained below.

The seatback pad 14A and the covering material 14B are attached to the seatback frame 22 as explained above. The flange portion 24B of the first headrest bush 24 provided with the support hole 24A and the flange portion 26B of the second headrest bush 26 provided with the support hole 26A are configured to project out from the top end portion of the seatback 14 in the attached state of the seatback pad 14A and the covering material 14B.

(Headrest Stay)

Figure 2A:
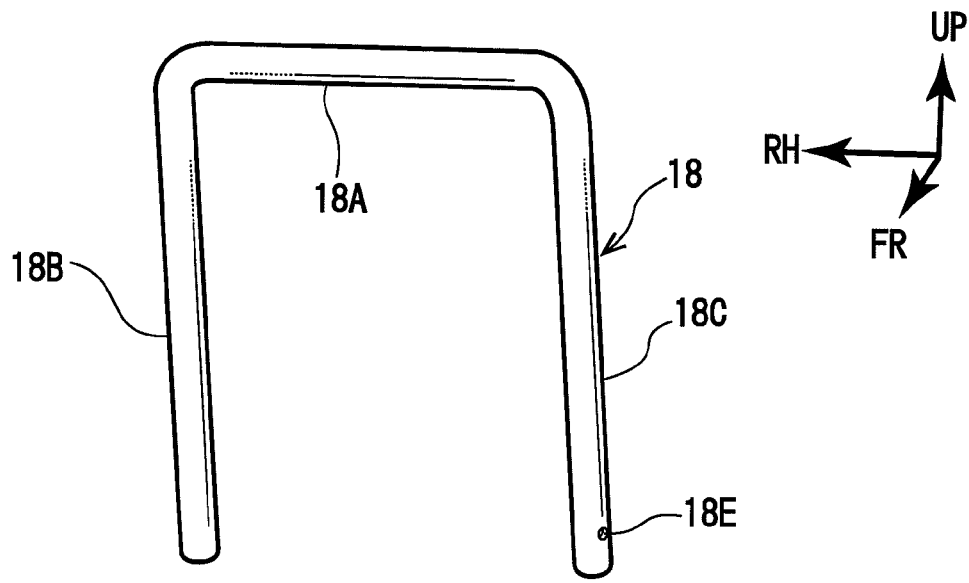
FIG. 2A is a perspective view illustrating a headrest stay.
Figure 2B:
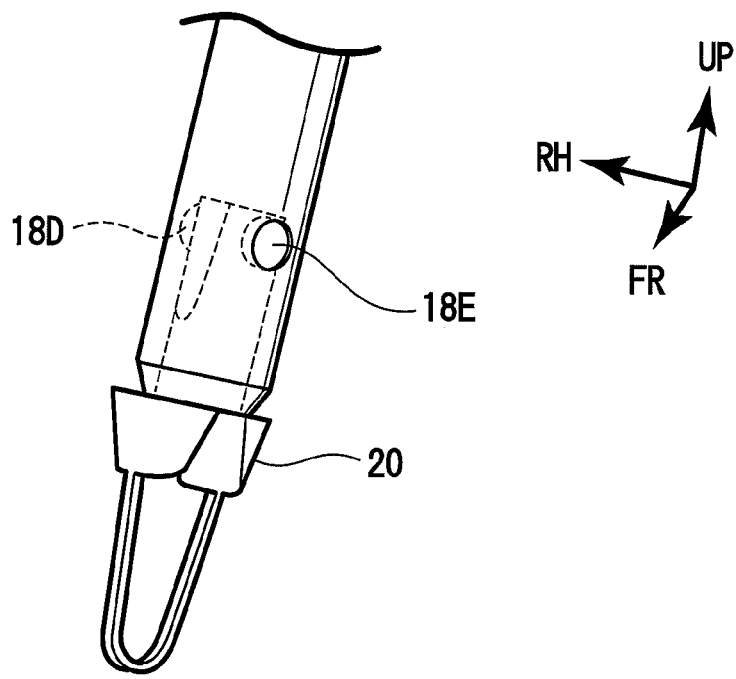
FIG. 2B is an enlarged perspective view illustrating a bottom end portion of a headrest stay to which a stopper member is attached.

As shown in FIG. 2A, the headrest stay 18 is formed, for example, by performing bend-machining on stainless steel pipe material. The headrest stay 18 is U-shaped opening towards the vehicle bottom side. More specifically, the headrest stay 18 is equipped with a base portion 18A extending in the vehicle width direction. The headrest stay 18 is also equipped with a first extending portion 18B that bends from the vehicle width direction right hand side end portion of the base portion 18A towards the vehicle bottom side, and a second extending portion 18C that bends from the vehicle width direction left hand side end portion of the base portion 18A towards the vehicle bottom side and extends substantially parallel to the first extending portion 18B. Furthermore, as shown in FIG. 2B, a first anchor hole 18D opening to the vehicle width direction right hand side and a second anchor hole 18E opening to the vehicle width direction left hand side are formed in a bottom end portion of the second extending portion 18C. Note that when the headrest main body 16 of the following explanation is provided with electrical components, such as a headrest monitor, attachment stays for the headrest monitor and the like are provided at the base portion 18A. Wiring layout holes are also formed in the base portion 18A to lay the headrest monitor wiring in the interior of the headrest stay 18.

The first extending portion 18B of the headrest stay 18 explained above, is inserted into the support hole 24A provided at the top end portion of the seatback 14, and the second extending portion 18C of the headrest stay 18 is inserted through the support hole 26A provided at the top end portion of the seatback 14. The headrest main body 16 fixed to the top end side of the headrest stay 18 is thereby supported so as to be capable of moving in the seat top-bottom direction.

(Headrest Main Body)

As shown in FIG. 1, the headrest main body 16 extends lengthwise along the vehicle width direction in a barrel shape that has been flattened from the vehicle front and rear directions. More specifically, the headrest main body 16 is configured such that a cushion material 16A formed from urethane foam is covered by a covering member 16B formed from a material such as cloth or leather. A fixing groove, not shown in the drawings, is formed in the cushion material 16A for fixing the cushion material 16A to the top end side of the headrest stay 18. The cushion material 16A is fixed to the top end side of the headrest stay 18 and then the covering member 16B is attached to the cushion material 16A.

(Stopper Member)

Figure 3A:
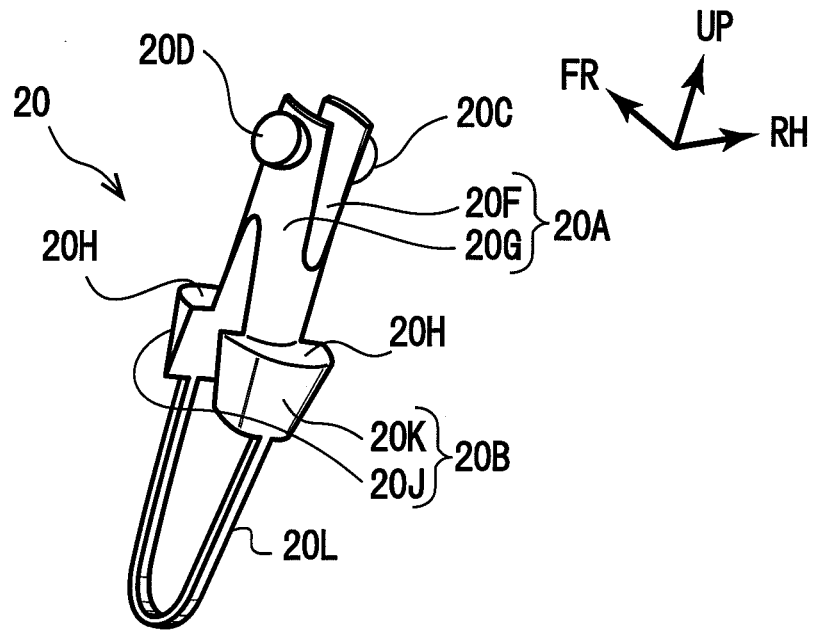
FIG. 3A is a perspective view illustrating a stopper member.

As shown in FIG. 3A, the stopper member 20 is a small component integrally molded from a resin material. More specifically, the stopper member 20 is equipped with a circular column shaped fixing portion 20A extending in the vehicle top-bottom direction, and a substantially circular truncated conical shaped stopper portion 20B that extends out from the bottom end portion of the fixing portion 20A towards the vehicle top-bottom direction bottom side.

Figure 3B:
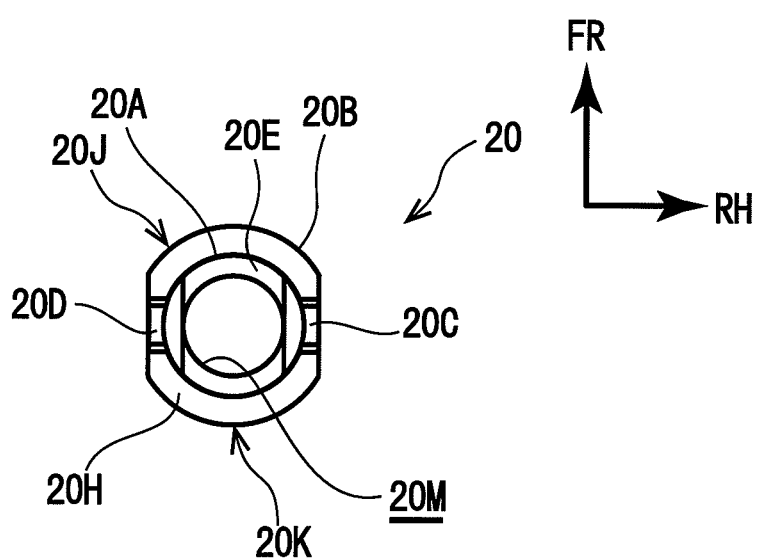
FIG. 3B is a plan view illustrating a stopper member.
Figure 3C:
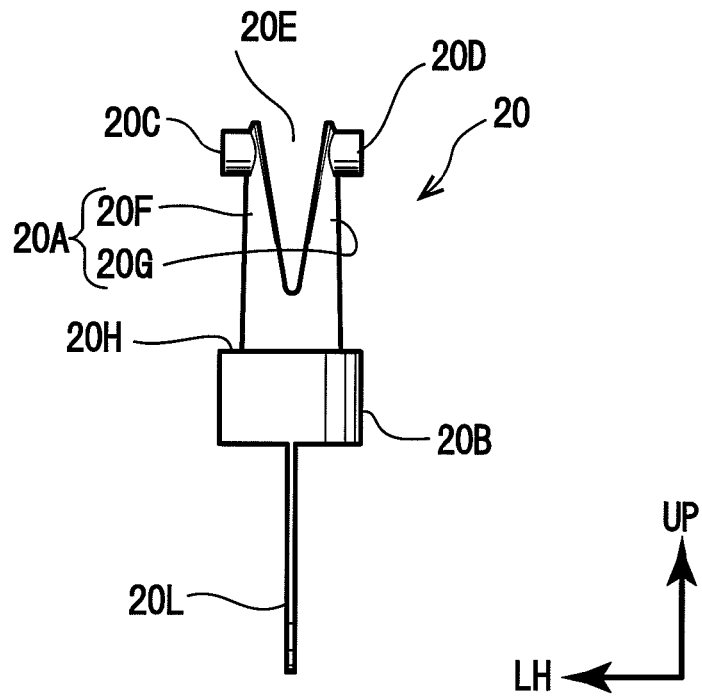
FIG. 3C is a front view illustrating a stopper member.

As shown in FIG. 3C, the fixing portion 20A is equipped with a first fixing portion 20F and a second fixing portion 20G A circular column shaped first anchor projection 20C is formed projecting out from the top end portion of the first fixing portion 20F to the vehicle width direction right hand side. A circular column shaped second anchor projection 20D is formed projecting out from the top end portion of the second fixing portion 20G to the vehicle width direction left hand side. A V-shaped grooved portion 20E is also formed to the fixing portion 20A as a rigidity lowering portion opening towards the vehicle top side. As a result of forming the V-shaped grooved portion 20E to the fixing portion 20A, the first fixing portion 20F provided with the first anchor projection 20C is rendered resiliently deformable in a direction (towards the vehicle width direction left hand side) opposite to a projection direction of the first anchor projection 20C. The second fixing portion 20G provided with the second anchor projection 20D is also rendered resiliently deformable in a direction (the vehicle width direction right hand side) opposite to a projection direction of the second anchor projection 20D. The first fixing portion 20F and the second fixing portion 20G are thereby inserted from the bottom end portion of the second extending portion 18C of the headrest stay 18 in a resiliently deformed state in the direction in which the first fixing portion 20F and the second fixing portion 20G approach each other. Then, due to resilient rebound of the first fixing portion 20F and the second fixing portion 20Q the first anchor projection 20C and the second anchor projection 20D latch respectively with the first anchor hole 18D and the second anchor hole 18E provided at the bottom end portion of the second extending portion 18C. As a result the stopper member 20 is fixed to the headrest stay 18.

Figure 3D:
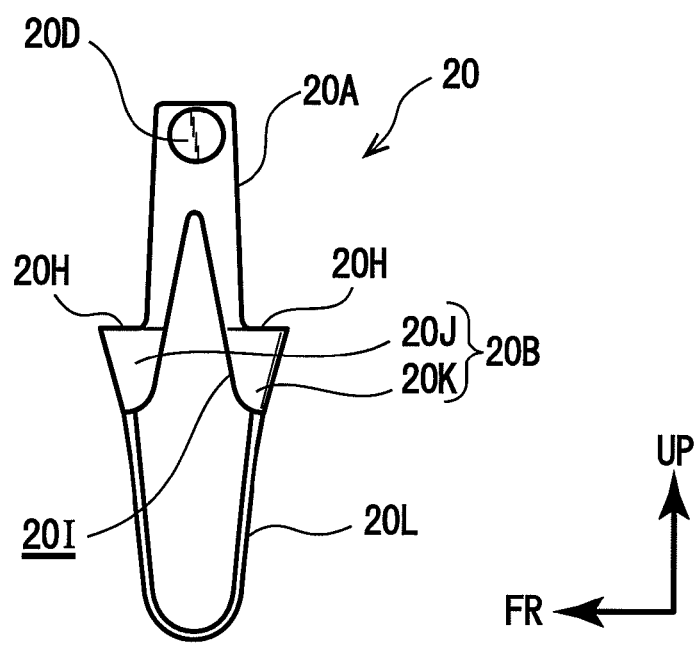
FIG. 3D is a side view illustrating a stopper member.

As shown in FIG. 3D, the stopper portion 20B is a circular truncated conical shape narrowing towards the vehicle bottom side. The outer diameter of the top end portion of the stopper portion 20B is an outer diameter the same as or greater than the outer diameter of the fixing portion 20A, and also the same as or greater than the inner diameter of the support hole 26A provided at the top end portion of the seatback 14. A step potion is accordingly formed between the fixing portion 20A and the stopper portion 20B. The step portion is configured with a claw portion 20H that catches on the end portion of the second headrest bush 26 provided at the top end portion of the seatback 14. A V-shaped grooved portion 20I serving as a rigidity lowering portion is also formed from the bottom end portion of the stopper portion 20B to an intermediate portion of the fixing portion 20A, opening towards the vehicle bottom side. As a result of forming the V-shaped grooved portion 20I, a first stopper portion 20J positioned at the vehicle front side and a second stopper portion 20K positioned at the vehicle rear side are rendered resiliently deformable in directions to approach or separate from each other. Namely, the first stopper portion 20J and the second stopper portion 20K are resiliently deformable in a direction orthogonal to the projection directions of the first anchor projection 20C and the second anchor projection 20D. Providing the V-shaped grooved portion 20I makes it possible to deform the outer diameter of the claw portion 20H of the stopper portion 20B to the inner diameter of the support hole 26A or smaller when the stopper member 20 is inserted through the support hole 26A provided at the top end portion of the seatback 14. A guide portion 20L that is U-shaped when viewed face on is provided so as to connect together the first stopper portion 20J and the second stopper portion 20K of the stopper portion 20B.

As shown in FIG. 3B, a through hole 20M is formed through the axial core portion of the stopper member 20, spanning the fixing portion 20A and the stopper portion 20B. The through hole 20M is configured such that wiring of headrest monitors or the like can be inserted through.

The headrest 10 is configured, as explained above, by attaching the headrest main body 16 to the top end portion of the headrest stay 18 and fixing the fixing portion 20A of the stopper member 20 to the bottom end portion of the second extending portion 18C of the headrest stay 18.

Explanation follows regarding operation and advantageous effects of the present invention.

Figure 4A:
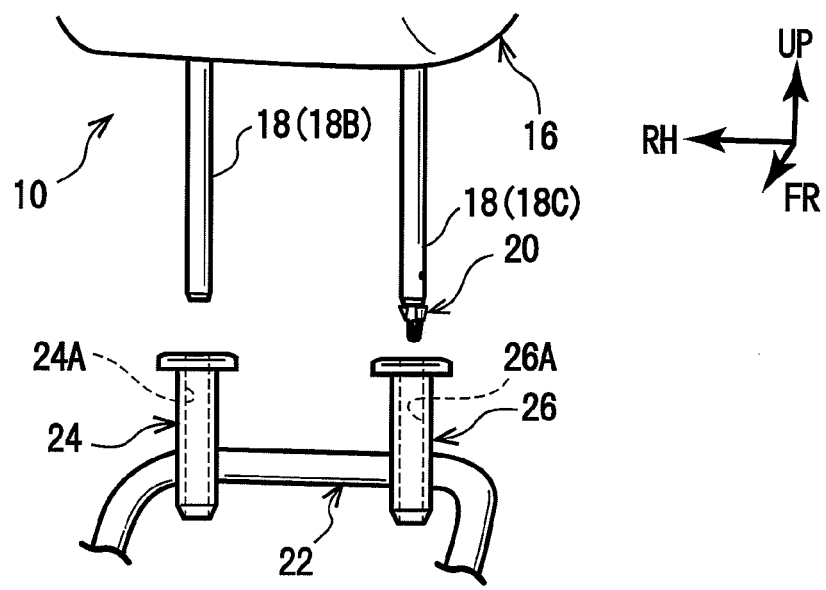
FIG. 4A is a perspective view illustrating a state prior to inserting a headrest stay into a support portion provided at a top end portion of a seatback.
Figure 4B:
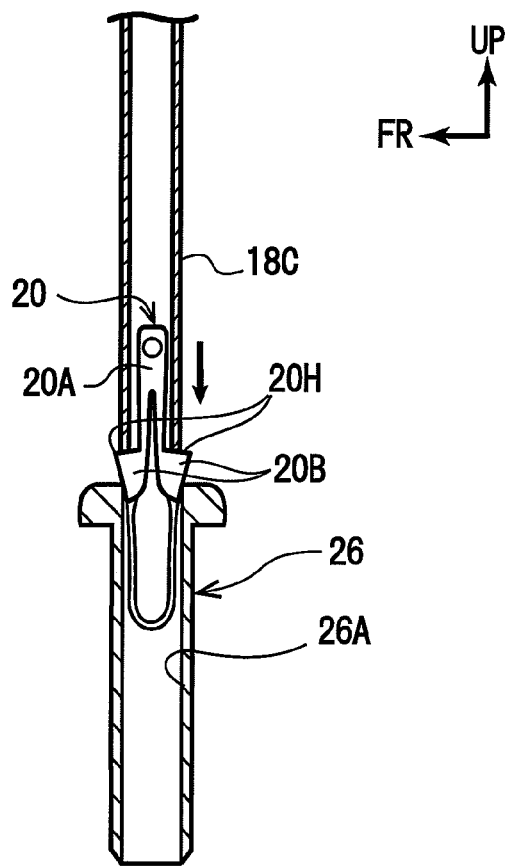
FIG. 4B is an expanded front view illustrating a stopper member in a state at the start of insertion into the entrance of a support portion.
Figure 4C:
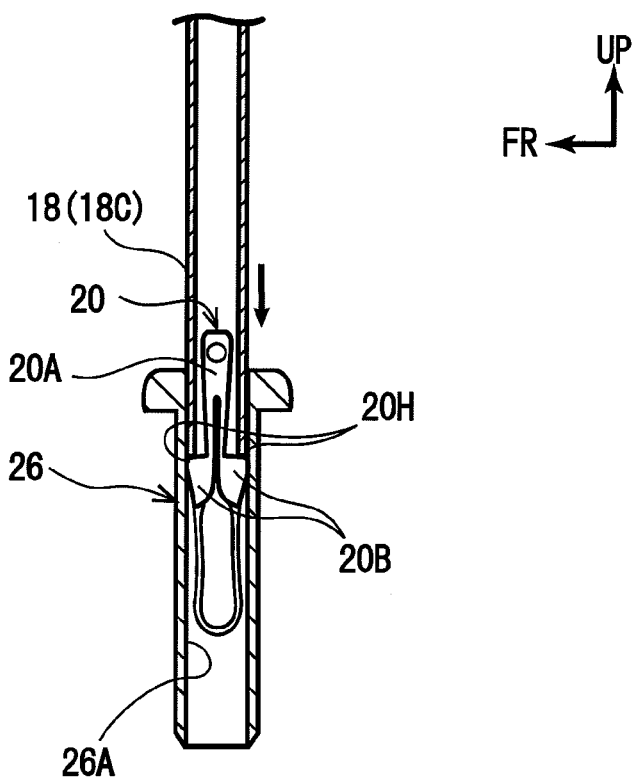
FIG. 4C is an expanded front view illustrating a stopper member in a state during insertion into a support portion.
Figure 4D:
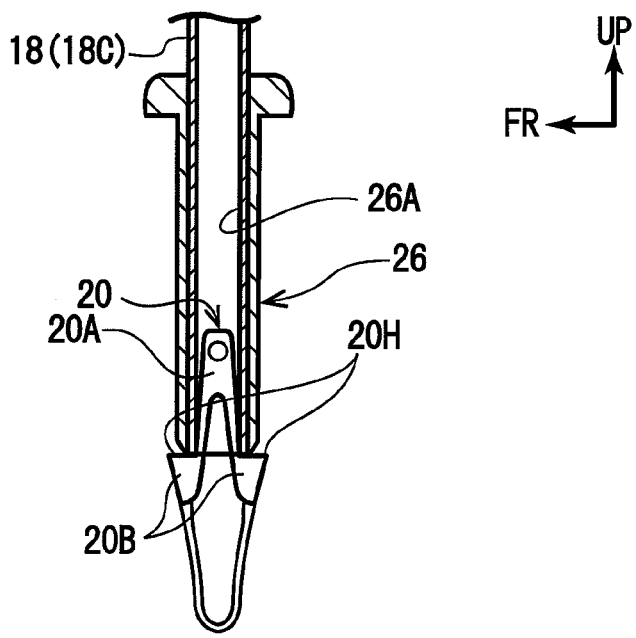
FIG. 4D is an expanded front view illustrating a stopper member in a state in which insertion into a support portion is complete.

As shown in FIG. 4A, when the headrest 10 is attached to the seatback 14, the first extending portion 18B of the headrest stay 18 is inserted through the support hole 24A provided at the top end portion of the seatback 14 and the second extending portion 18C of the headrest stay 18 is inserted through the support hole 26A provided at the top end portion of the seatback 14. In such cases, as shown in FIG. 4B, the stopper portion 20B of the stopper member 20 attached to the leading end of the second extending portion 18C resiliently deforms, and the outer diameter of the claw portion 20H is deformed by the entrance to the support hole 26A to the inner diameter of the support hole 26A or smaller. As shown in FIG. 3C, the stopper member 20 and the second extending portion 18C of the headrest stay 18 are inserted through the support hole 26A in a state in which the outer diameter of the claw portion 20H is held at the inner diameter of the support hole 26A or smaller. As shown in FIG. 4D, the stopper portion 20B resiliently rebounds when insertion through the support hole 26A has been completed, returning to a state in which the outer diameter of the claw portion 20H of the stopper portion 20B exceeds the inner diameter of the support hole 26A.

Figure 5A:
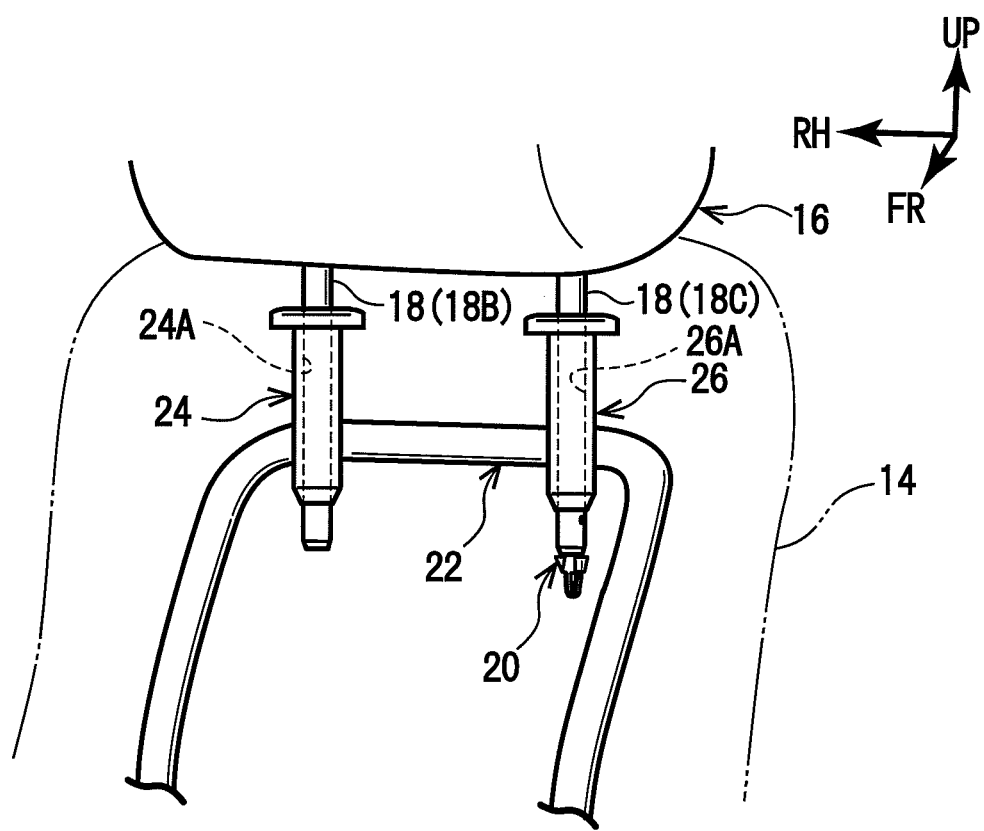
FIG. 5A is a perspective view illustrating an overall headrest structure in a state in which a stopper member has moved in a direction of exiting from a support portion.
Figure 5B:
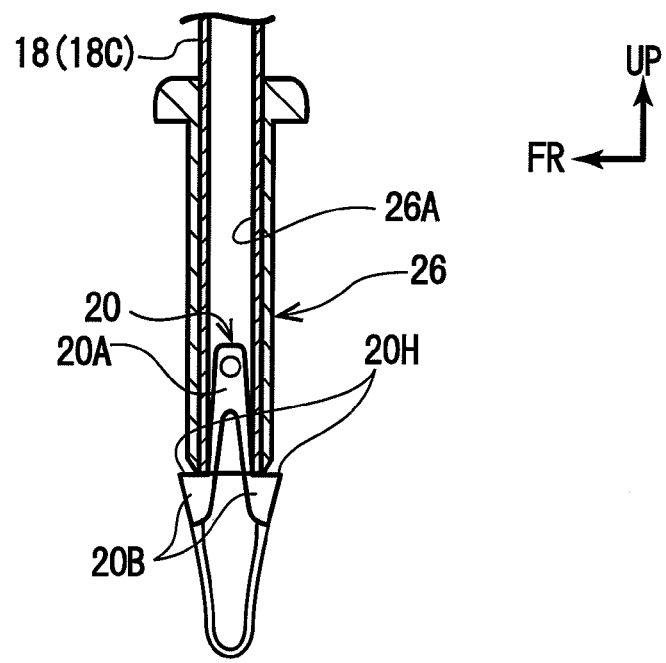
FIG. 5B is an expanded front view illustrating a state in which a claw portion of a stopper member has caught on an external edge portion of a support portion.
Figure 5C:
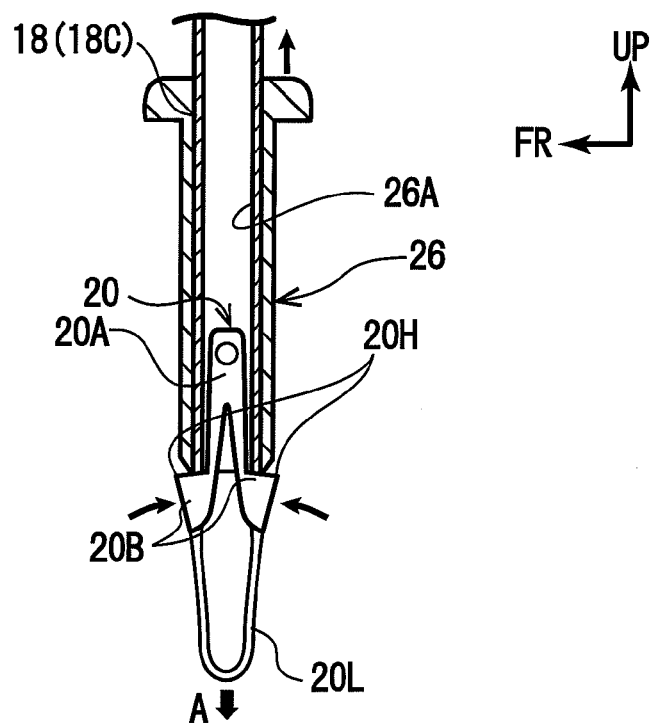
FIG. 5C is an expanded front view illustrating a stopper member in a state in which a guide portion is being manipulated.

As shown in FIG. 5A, when the first extending portion 18B and the second extending portion 18C of the headrest stay 18 move in the direction of exiting from the support hole 24A and the support hole 26A, respectively, the first extending portion 18B and the second extending portion 18C of the headrest stay 18 are prevented from exiting from the support hole 24A and the support hole 26A by the stopper member 20. In more detail, as shown in FIG. 5B, the second extending portion 18C of the headrest stay 18 is prevented from exiting from the support hole 26A due to the claw portion 20H of the stopper member 20 catching on the end portion of the second headrest bush 26. In conjunction, the first extending portion 18B of the headrest stay 18 is also rendered unable to exit from the support hole 24A. When the need arises to remove the headrest 10 from the seatback 14 such as for vehicle maintenance, the outer diameter of the claw portion 20H of the stopper portion 20B is made the same as or smaller than the inner diameter of the through hole 20M by pulling the guide portion 20L of the stopper member 20 in the arrow A direction, as shown in FIG. 5C, from through a service hole provided at the seatback 14 (a hole employed for performing maintenance and enabling access from the hole to the stopper member attached to the headrest stay). The headrest 10 can be removed from the seatback 14 by pulling the headrest stay 18 towards the vehicle top-bottom direction top side while this state is adopted.

As explained above, in the headrest 10 of the present exemplary embodiment, due to providing the integrally structured stopper member 20, machining to the headrest stay and an increase in the number of components can be suppressed to a minimum while still preventing the headrest stay 18 from unintentionally exiting from the support holes 24A, 26A provided at the top end portion of the seatback 14.

Moreover, in the present exemplary embodiment, the stopper member 20 can be fixed to the headrest stay 18 with a simple configuration, in which the first anchor projection 20C and the second anchor projection 20D are provided at the fixing portion 20A of the stopper member 20 and the first anchor hole 18D and the second anchor hole 18E are provided at the headrest stay 18.

Furthermore, in the present exemplary embodiment, due to the above configuration in which the V-shaped grooved portion 20E is provided at the fixing portion 20A, the first fixing portion 20F and the second fixing portion 20G are rendered resiliently deformable in directions to approach or separate from each other. The first anchor projection 20C and the second anchor projection 20D can accordingly be suppressed from snagging on the bottom end portion of the headrest stay 18 when the fixing portion 20A is inserted into the second extending portion 18C of the headrest stay 18.

In the present exemplary embodiment, the V-shaped grooved portion 20I is also formed in the stopper portion 20B to enable resilient deformation in the direction orthogonal to the projection directions of the first anchor projection 20C and the second anchor projection 20D. The first anchor projection 20C and the second anchor projection 20D provided at the fixing portion 20A can accordingly be suppressed from deforming in the direction of exiting from the first anchor hole 18D and the second anchor hole 18E provided at the headrest stay 18 accompanying deformation of the stopper portion 20B.

In the present exemplary embodiment, the ease of service for the operation to remove the headrest 10 from the seatback 14 can be raised due to providing the guide portion 20L to the stopper member 20.

Furthermore, in the present exemplary embodiment it is possible to layout wiring of electrical components such as a headrest monitor provided at the headrest main body 16 towards the interior of the seatback 14 due to providing the through hole 20M in the stopper member 20. As a result negative impact to the external design appearance of the headrest 10, such as by wiring of electrical components being laid out so as to project out from the vicinity of the headrest main body 16, can be suppressed.

Figure 6A:
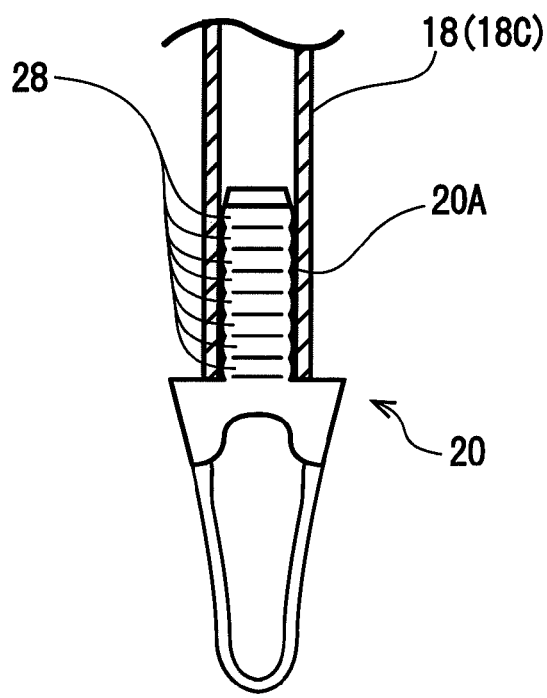
FIG. 6A is a perspective view illustrating a fixing portion of a stopper member according to a modified example.
Figure 6B:
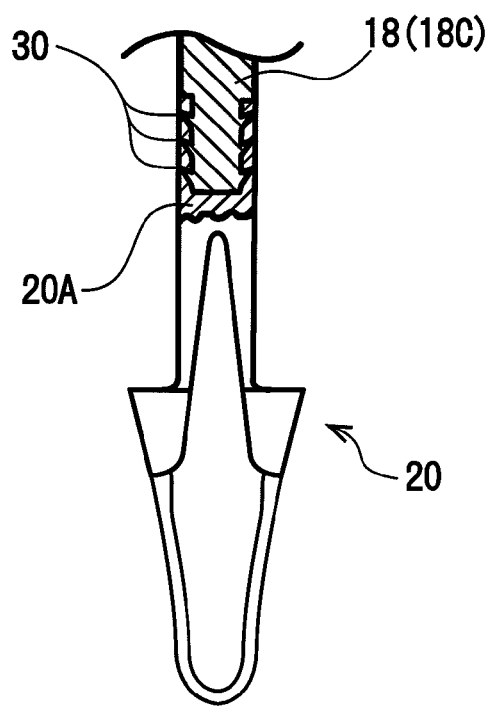
FIG. 6B is a perspective view illustrating a fixing portion of a stopper member according to a modified example.

In the present exemplary embodiment an example has been explained in which the stopper member 20 is fixed to the headrest stay 18 by the first anchor projection 20C and the second anchor projection 20D provided at the stopper member 20 latching respectively in the first anchor hole 18D and the second engagement hole 18E provided at the headrest stay 18. However, the present invention is not limited thereby and another fixing method may be applied. For example, as shown in FIG. 6A, plural step portions 28 may be provided at the outer peripheral portion of the fixing portion 20A, and the stopper member 20 fixed to the headrest stay 18 by press fitting the fixing portion 20A into the bottom end portion of the second extending portion 18C of the headrest stay 18. Furthermore, as shown in FIG. 6B, configuration may be made with plural barbed portions 30 provided at the bottom end portion of the second extending portion 18C of the headrest stay 18, and the fixing portion 20A of the stopper member 20 cast so as to cover the barbed portions 30. The fixing method of the headrest stay 18 and the stopper member 20, such as fixing the stopper member 20 to the headrest stay 18 by employing an adhesive, may be set as appropriate in consideration of such factors as strength and the manufacturing processes.

Figure 6C:
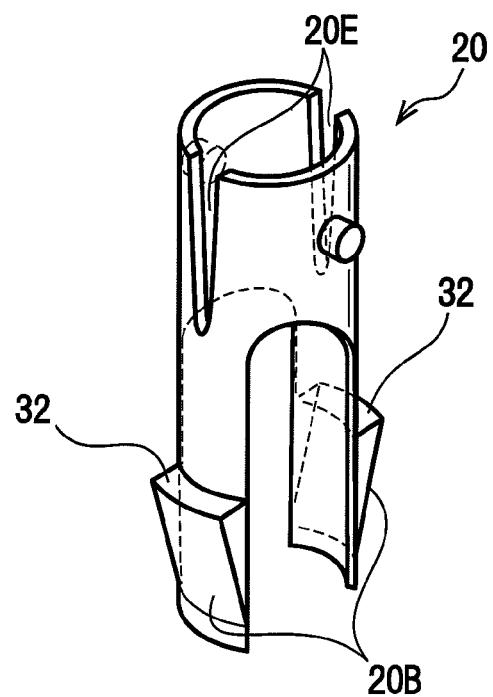
FIG. 6C is a perspective view illustrating a stopper portion of a stopper member according to a modified example.
Figure 6D:
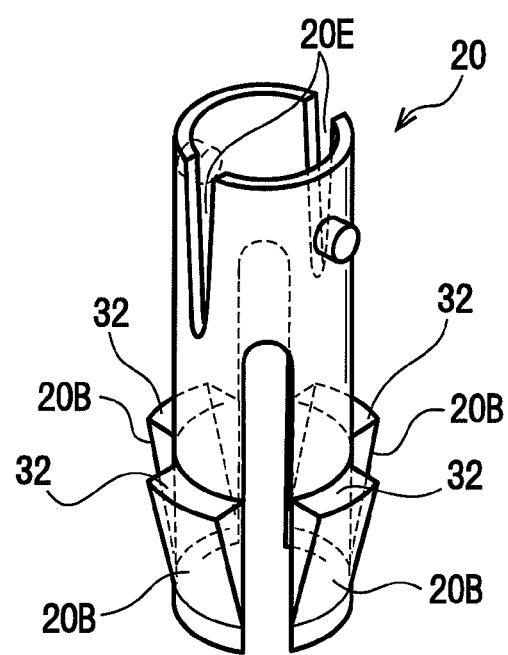
FIG. 6D is a perspective view illustrating a stopper portion of a stopper member according to a modified example.

Explanation has been given in the present exemplary embodiment of an example in which the stopper portion 20B of circular truncated conical shape narrowing towards the bottom side is provided at the bottom end portion of the stopper member 20, however the present invention is not limited thereto. For example, as illustrated in FIG. 6C, the stopper portion 20B may be configured with two projections formed as triangular column shaped projection portions 32. Moreover, as shown in FIG. 6D, configuration may be made formed with four of the projection portions 32. Such factors as the shape of the stopper portion 20B may be appropriately set in this manner by considering such factors as the load acting on the stopper portion 20B when the headrest stay 18 is pulled out from the support hole 26A provided at the seatback 14.

While the present invention has been explained above through the first exemplary embodiment, the present invention is not limited by the above. Obviously it is possible to implement various other modifications than those listed above within a scope not departing from the spirit of the present invention.

What is claimed is:

1. A headrest structure comprising:
a headrest main body provided above a seatback;
a headrest stay that supports the headrest main body so as to be capable of moving in a seat top-bottom direction due to a top end side of the headrest stay being fixed to the headrest main body and a bottom end portion of the headrest stay being inserted into a tube shaped support portion provided at a top end portion of the seatback; and
a stopper member of integral structure, a first end portion of the stopper member configuring a fixing portion fixed to the bottom end portion of the headrest stay, a second end portion of the stopper member configuring a stopper portion that is inserted into the support portion and is formed with a claw portion, when the stopper portion is inserted into the support portion, the claw portion resiliently deforming such that an outer diameter of the claw portion corresponds to an inner diameter of the support portion or smaller, when the stopper portion has been completely inserted into the support portion, the claw portion resiliently rebounding such that the outer diameter of the claw portion exceeds the inner diameter of the support portion, and when the stopper portion moves in a direction of exiting from the support portion, the claw portion catches on an end portion of the support portion.

2. The headrest structure of claim 1 wherein:
the headrest stay is configured with a hollow pipe structure at least at the bottom end portion of the headrest stay, and an anchor hole is provided at a peripheral wall of the bottom end portion of the headrest stay; and
an anchor projection is provided at the fixing portion of the stopper member and the anchor projection latches into the anchor hole due to being inserted into the bottom end portion of the headrest stay.

3. The headrest structure of claim 2 wherein a rigidity lowering portion is provided at the fixing portion of the stopper member to render the fixing portion resiliently deformable in a direction in which the anchor projection exits from the anchor hole.

4. The headrest structure of claim 3 wherein a rigidity lowering portion is provided at the stopper portion of the stopper member to render the stopper portion resiliently deformable in a direction substantially orthogonal to a direction in which the anchor projection is projected.

5. The headrest structure of claim 1 wherein a wiring layout through hole is formed in the stopper member spanning the fixing portion and the stopper portion.

6. The headrest structure of claim 1 wherein a guide portion is provided at the stopper portion of the stopper member to resiliently deform the stopper portion such that the outer diameter of the claw portion becomes an outer diameter that is smaller than the inner diameter of the support portion.

* * * * *